Patented June 17, 1930

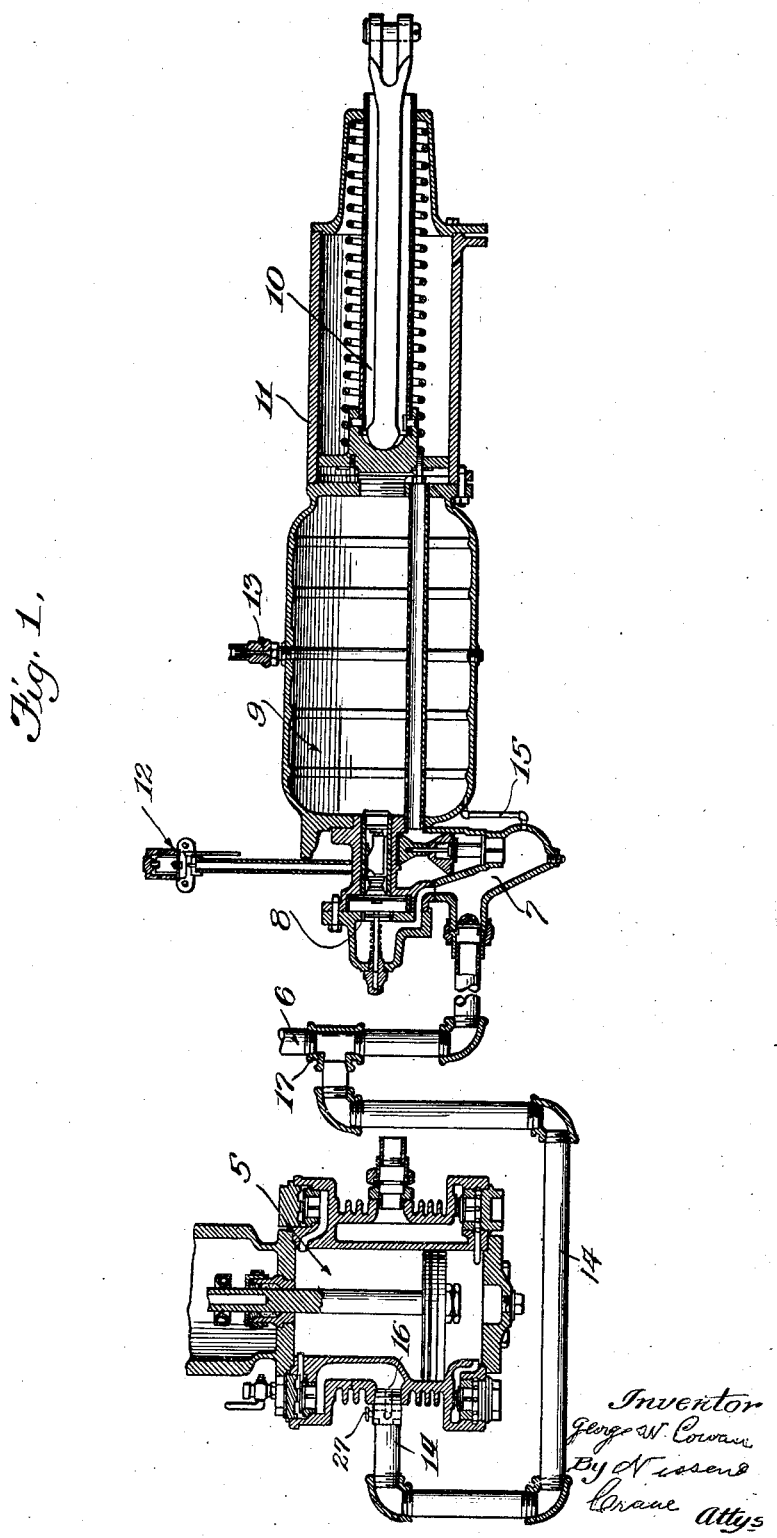

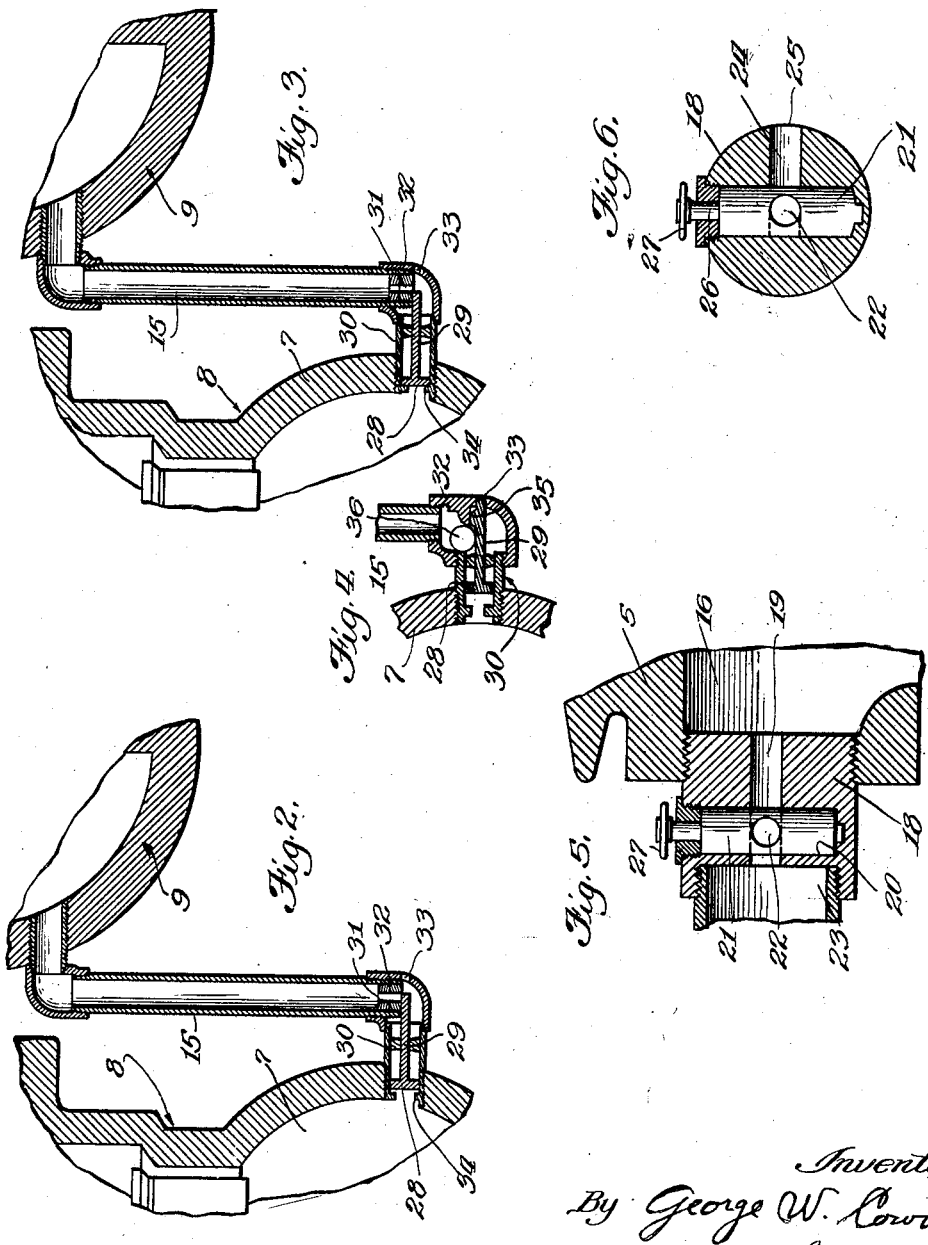

1,764,152

UNITED STATES PATENT OFFICE

GEORGE W. COWAN, OF BARTLETT, ILLINOIS

AIR-BRAKE SYSTEM FOR RAILWAY ROLLING STOCK

Application filed August 29, 1927. Serial No. 216,020.

My invention relates to air brake equipment for railway rolling stock and has for its primary object the provision of convenient and practical means for bleeding the auxiliary reservoirs of an air brake system and to so construct this means that it may be combined with all standard brake systems at a comparatively small cost and without in any way sacrificing the practical operation of the system.

As heretofore practiced, when a train of cars was sidetracked after a run, as an example, the brakeman was required to bleed the auxiliary reservoirs of each car by manipulating a valve provided for this purpose in each car. This routine procedure required considerable time as well as manual effort. A brake system embodying my improvements will do away with the necessity of imposing this routine upon the brakeman, and, in its preferred form, the improvements comprise means which may be manipulated by the engineer in the engine cab and which will enable the engineer to bleed all of the auxiliary reservoirs collectively.

The salient features of the invention are exemplified in the combination and arrangement of parts illustrated in the accompanying drawings and described in the following specification and are more particularly pointed out in the appended claims.

In the drawings:—

Fig. 1 is a diagrammatic view of those parts of a conventional air brake system with which my improvements are associated;

Fig. 2 is a detail view in section of the bleeder pipe and the control valve therefor for each of the auxiliary reservoirs;

Fig. 3 is a similar view showing the valve open for bleeding the reservoir;

Fig. 4 is a detail view in section of a modified form of control valve for the bleeder pipe;

Fig. 5 is a detail view in section of the control valve between the main pump of the system and the brake line; and Fig. 6 is a view in section of the same valve but looking at the front of the same.

Referring now to the drawings in detail, I have selected for illustrating the application of my invention, a conventional type of quick-action automatic brake equipment for railway trains. I have not shown all of the detail parts of the brake equipment since the same will not be required to properly illustrate my invention. For a complete disclosure of the equipment with which my improvements may be combined, I will refer to any of the Westinghouse automatic brake equipment which is in common use.

In the present illustration, 5 represents the main air pump which is used to fill the main reservoirs of the brake system (not shown). The air control for the brakes is supplied through the brake pipe 6 from these main reservoirs. The brake pipe communicates with the base 7 of the triple valve 8 which, in turn, controls the admission of air into the auxiliary reservoir 9 for actuating the brake piston 10 in the brake cylinder 11. The triple valve 8 is equipped with the pressure retaining valve 12 and the release valve 13. Of course, each car is equipped with an auxiliary reservoir 9 and when a train of cars are side-tracked, as an example, the brakeman is required to bleed each of these reservoirs. With my invention, I have provided means whereby the engineer may collectively bleed the auxiliary reservoirs and to accomplish this I prefer to establish a pipe line 14 between the brake pipe 6 and the pump 5 and to connect a valve controlled bleeder pipe 15 between the base 7 of each of the triple valves 8 and each of the auxiliary reservoirs 9. Ordinarily, the pump 5 is provided with an air inlet, as at 16, in the side thereof so that the piston may take the air from atmosphere into the pump for filling the main reservoirs. The pipe line 14 is connected to this air inlet and extends around the pump and communicates with the brake pipe 6 as at 17. In combining my improvements with the system, it is necessary to leave the intake 16 into the pump normally operable and for this purpose I have devised a two-way valve which may be fitted to the intake for connecting the pipes 14. This valve is illustrated in Figs. 5 and 6 as comprising a nipple 18 threaded into the intake 16 having a horizontally extending bore 19 terminating in a cylindrical housing 20 for the plug valve 21, the valve 21 being provided with a radial T-opening 22 and mounted for rotation so that when turned in one position, the radial opening 22 will establish communication through the horizontal bore 19 into the pipe 14 which is fitted in the end 23 of the valve housing. The valve housing also has a radial bore 24 which terminates in an end 25 open to atmosphere with its opposite end terminating in position to register with the radial opening 22 in the valve 21 when the valve is turned to close the communication beween the horizontal bore 19 and the pipe 14. The stem 26 for the valve may be equipped with any convenient turning means as at 27 so that a manipulating rod or the like may be connected to the valve and extended into the engineer's cab. With this means, the engineer may turn the valve 21 into one position which will establish a communication from atmosphere to the pump 5 so that the main reservoirs of the system may be charged by the pump, or else he can turn the valve to establish communication between the pump 5 and the pipe line 14. In this event, the suction created by the pump will develop a suction in the pipe line 14, and, through it, in the brake pipe 6.

Referring now to the bleeder pipe connection between each of the triple valves and the auxiliary reservoirs of the system, attention is directed to Figs. 2 to 4, inclusive. This bleeder pipe 15 is equipped with a valve responsive to the suction developed in the base 7 of the triple valve 8 when the pump is operated and the valve at the inlet 16 turned to establish communication with the pipe line 14. The valve for this purpose preferably comprises a head 28 having a slide 29. Both the head and the slide are mounted for reciprocation in the pipe connection 30 so that the slide 29 may cover and uncover a restricted opening 31 in the end of the pipe 15. The L-fitting 32 for connecting the pipe connection 30 with the pipe 15 is made with an exhaust port 33 so as to establish communication with atmosphere when the slide 29 uncovers the restricted opening 31. Ordinarily, the air pressure in the base 7 of the triple valve 8 will hold the valve in its extended position so that the slide 29 thereof will cover the opening 31 and thus close the bleeder pipe during the normal operation of the brake system. When the pressure in the base 7 of the triple valve is relieved and a suction created therein, by connecting the pump 5 with the pipe 14 and the brake pipe 6, the valve will respond to the suction and the slide 29 will be retracted against the stop 34 so as to uncover the restricted opening 31 permitting the air in the auxiliary reservoir 9 to escape through the pipe 15 and out into atmosphere through the exhaust port 33. The open and closed positions of the valve are illustrated in Figs. 2 and 3, Fig. 2 showing the valve closed and Fig. 3 showing the valve open.

A modified form of the valve is shown in Fig. 4 in which the same principle of operation is involved but the slide 29 instead of covering and uncovering the opening 31 is made with a button-like obstruction 35 which is adapted to wipe against the ball valve 36 and unseat the same which will establish a communication from the pipe 15 through the exhaust port 33 in the L 32. When air pressure is developed in the base 7 of the triple valve, the slide 29 of the valve will be projected forward, as in the other form illustrated, but with the button-like obstruction in advance of the ball 36 so that the ball will be retained seated by the pressure of the air in the auxiliary reservoir 9. The end of the slide 29 will also be projected through the exhaust port 33. When suction is created in the base 7, the slide 29 will be retracted out of the exhaust port 33 and at the same time will raise the ball 36 off its seat permitting the auxiliary reservoir to be bled.

In the form shown in Figs. 2 and 3, the slide, for all practical purposes, is a suction responsive valve for controlling the exhaust port of the auxiliary reservoir, whereas in the form shown in Fig. 4, the ball is the valve and the slide 29 becomes the suction responsive means for opening and closing the valve.

Obviously those skilled in the art may make various changes in the details and arrangement of parts without departing from the spirit and scope of the invention as defined by the appended claims, and I wish therefore not to be restricted to the precise construction herein disclosed.

I claim:

1. In an air brake system having an air pump and an auxiliary reservoir, the combination of a bleeder valve for the auxiliary reservoir responsive to suction developed by the air pump for bleeding said reservoir.

2. In an air brake system, the combination of a bleeder valve for the auxiliary reservoir of the system, said valve being interposed between a triple valve and the auxiliary reservoir and a communication between the bleeder valve and the air pump of the system for opening the bleeder valve by suction developed by said pump.

3. In an air brake system, an auxiliary reservoir, an exhaust port for bleeding said reservoir, and a suction responsive valve for opening said port.

4. In an air brake system, an auxiliary reservoir, an exhaust port for bleeding said reservoir, a valve for said port, and suction responsive means for actuating said valve.

5. In an air brake system, an auxiliary reservoir, an air pump, an exhaust port for bleeding said reservoir, and means responsive to suction developed by said pump for opening said exhaust port.

6. In an air brake system, an auxiliary reservoir, an air pump, an exhaust port for bleeding said reservoir, and means responsive to suction developed by said pump for opening said exhaust port comprising a headed slide, a housing for said slide, and a communication between said housing and an inlet in said air pump.

7. In an air brake system, an auxiliary reservoir, an air pump, an exhaust port for bleeding said reservoir, and means responsive to suction developed by said pump for opening said exhaust port comprising a headed slide, a housing for said slide, a communication between said housing and an air inlet in said pump, and a valve for said air inlet in the pump for closing said communication and opening the pump to atmosphere through said inlet.

8. In an air brake system, an air pump having an air inlet, an air pipe, a triple valve communicating with said air pipe through which air pressure is introduced into an auxiliary reservoir, and a bleeder valve for said reservoir interposed between the triple valve and the reservoir, and means for opening said valve in response to suction developed by said air pump.

9. In an air brake system, an air pump having an air inlet, an air pipe, a triple valve communicating with said air pipe through which air pressure is introduced into an auxiliary reservoir, and a bleeder valve for said reservoir interposed between the triple valve and the reservoir, and means for opening said valve in response to suction developed by said air pump comprising a direct pipe line between the pump and the air pipe, said pipe line being connected to the air inlet of the pump, and a valve at said air inlet for closing said pipe line when the air inlet is open to atmosphere.

10. The combination as set forth in claim 9 and in which the bleeder valve comprises a headed slide mounted within a pipe connection communicating with the base of the triple valve, and an exhaust port to atmosphere controlled by said slide.

11. The combination as set forth in claim 9 and in which the bleeder valve comprises a ball, a seat for the ball, and a suction responsive slide mounted below the ball and adapted to wipe against the same to raise it off said seat.

12. In an air brake system, an auxiliary reservoir, a bleeder valve therefor comprising a suction responsive slide, and an opening in a pipe connected with the reservoir which said slide controls.

13. In combination, an auxiliary reservoir for air brakes, a triple valve for said reservoir, a direct pipe connection between said reservoir and said triple valve, an exhaust port in said pipe connection for bleeding said reservoir, and means for opening and closing said port comprising a valve constructed to respond to air pressure for closing said port and responsive to suction to open said port.

14. An air brake system for a train of cars comprising an auxiliary air reservoir for each car, and means for bleeding all of said reservoirs comprising a valve for each reservoir, and means located in one of the cars for collectively opening said valves.

15. An air brake system for a train of cars comprising an auxiliary air reservoir for each car, a main pump by which said reservoirs are indirectly filled with air, and means for using said pump to bleed said reservoirs.

16. An air brake system for a train of cars comprising an auxiliary air reservoir for each car, a main pump by which said reservoirs are indirectly filled with air, and means for using said pump to bleed said reservoirs comprising a suction responsive bleeder valve for each reservoir and a pipe line connected with each of said bleeder valves and the air intake of the pump.

17. An air brake system for a train of cars comprising an auxiliary air reservoir for each car, a main pump by which said reservoirs are indirectly filled with air, and means for using said pump to bleed said reservoirs comprising a pipe line connected with a suction responsive bleeder valve for each of said reservoirs, a connection between said pipe line and the air intake of said pump, and a valve at the air intake of the pump for closing said air intake to atmosphere when the pump is in communication with said pipe line.

18. An air brake system for a train of cars comprising an auxiliary air reservoir for each car, a main pump by which said reservoirs are indirectly filled with air, and means for using said pump to bleed said reservoirs comprising a pipe line connected with a suction responsive bleeder valve for each of said reservoirs, a connection between said pipe line and the air intake of said pump, a valve at the air intake of the pump for closing said air intake to atmosphere when the pump is in communication with said pipe line, and a remote manually operated control for said last-named valve.

In testimony whereof I have signed my name to this specification on this 25th day of August, A. D. 1927.

GEORGE W. COWAN.